United States Patent
Allman et al.

(10) Patent No.: US 7,434,940 B2
(45) Date of Patent: Oct. 14, 2008

(54) LIGHT COUPLING SYSTEM AND METHOD

(75) Inventors: Stuart Allman, San Diego, CA (US);
Scott Lerner, Corvallis, OR (US);
Anurag Gupta, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 361 days.

(21) Appl. No.: 11/220,133

(22) Filed: Sep. 6, 2005

(65) Prior Publication Data

US 2007/0052929 A1 Mar. 8, 2007

(51) Int. Cl.
G03B 21/20 (2006.01)
F21V 7/04 (2006.01)
G09G 3/32 (2006.01)
G02F 1/295 (2006.01)
G02B 6/42 (2006.01)

(52) U.S. Cl. .......................... 353/85; 353/31; 362/612; 362/555; 345/82; 385/10; 385/9; 385/28; 385/32; 385/39

(58) Field of Classification Search .................. 353/31, 353/85; 362/612, 555; 345/82; 385/10, 385/9, 28, 32, 39; 348/754; 372/50.11
See application file for complete search history.

(56) References Cited

U.S. PATENT DOCUMENTS

| | | | |
|---|---|---|---|
| 6,222,674 B1 | 4/2001 | Ohta | |
| 6,421,103 B2 | 7/2002 | Yamaguchi | |
| 6,480,634 B1 | 11/2002 | Corrigan | |
| 6,527,410 B2 | 3/2003 | Yamaguchi | |
| 6,608,715 B2 | 8/2003 | Zhang | |
| 6,646,772 B1 | 11/2003 | Popovich | |
| 6,871,982 B2 | 3/2005 | Holman | |
| 6,882,379 B1 | 4/2005 | Yokoyama | |
| 2004/0080938 A1* | 4/2004 | Holman et al. | 362/231 |
| 2004/0228574 A1 | 11/2004 | Chen et al. | |
| 2005/0013523 A1 | 1/2005 | Gunther | |

FOREIGN PATENT DOCUMENTS

| | | |
|---|---|---|
| EP | 1 710 619 A | 10/2006 |
| FR | 2 857 109 A1 | 1/2005 |
| JP | 11-344681 A | 12/1999 |
| WO | WO 2005/073798 A | 8/2005 |

* cited by examiner

*Primary Examiner*—Diane I. Lee
*Assistant Examiner*—Magda Cruz

(57) ABSTRACT

A light coupling system includes a waveguide, configured to receive light from at least two light sources and to internally reflect light therein; a diffraction grating, disposed upon the waveguide; and a switchable Bragg grating, disposed upon the waveguide. The diffraction grating is configured to couple light from at least one of the light sources into the waveguide, and the switchable Bragg grating is configured to selectively couple light out of the waveguide, such that the light from the at least two light sources is selectively directed along a common projection axis.

23 Claims, 2 Drawing Sheets

LIGHT COUPLING SYSTEM AND METHOD

BACKGROUND

There are a variety of types of digital projection systems that have been developed and gained widespread use in recent years. Digital projection systems generally include a spatial light modulator for producing an image signal, and a light source to illuminate the light modulator and associated optical elements to project a desired image to a projection surface. Types of spatial light modulators currently in use for projection systems include liquid crystal display (LCD) systems (both reflective and transmissive), liquid crystal on silicon (LCOS) displays, and digital mirror devices (DMD), among others.

Many digital projection systems require that the light source provide a rapid sequence of primary colored light (typically red, green, and blue) during each image frame. The light modulator, in synchronization with the timing of the switching of red, green and blue colors, sequentially produces images corresponding to the red image signal, green image signal, and blue image signal for a given image frame. The separate color images are integrated in the eye of the viewer to give the appearance of a single full color image.

Providing the sequence of primary colors can be done in various ways. Many projection systems include a single high output lamp (e.g. an arc lamp, incandescent lamp, etc.) that provides white light, the light from the lamp being temporally divided into the sequence of primary colors via a color wheel having a sequence of color filters. The color wheel mechanically rotates in synch with the refresh rate of the light modulator, so that the white light beam sequentially passes through each color filter once during each image frame to provide the separate primary colors.

Unfortunately, projection systems that employ mechanical color wheels present certain drawbacks. The color wheel itself and the motor that drives it tend to be bulky, causing the associated projectors to also be larger and heavier. The mechanically rotating color wheel and its motor also produce unwanted noise. Additionally, high output incandescent projector bulbs are expensive, have a limited useful life, produce relatively large amounts of heat, and consume a relatively large amount of electricity, in addition to that consumed by the color wheel motor.

To address some of these problems, projector light systems that utilize LEDs have been proposed. LEDs have some advantages over conventional projection bulbs. They use less electricity per unit light output, and produce less heat. They can also be less expensive and more durable than high output projector bulbs. Additionally, LEDs can be rapidly switched to provide light of a desired color precisely in synch with an image modulator.

Unfortunately, individual LEDs provide far less light than a typical high output incandescent projector bulb. Consequently, to provide the quantity of light need, an array of many LEDs is required. It is useful for projection for the light from the LEDs in the array to be combined and redirected into a single output stream. While this can be done in many ways, some methods present undesirable aspects.

One method for combining and redirecting light from multiple LED sources is with the use of a dichroic x-cube or pair of dichroic plates. This device receives light from three different locations, and redirects the light into a common output stream, allowing red, green, and blue light streams to be combined into an effective white light source. Unfortunately, this method is bulky, and not well suited to working from a lighting array of three coplanar color sources. Additionally, expensive thin-film dichroic coatings may be required.

Another method for combining and aligning multiple color sources is with a stack of switchable diffraction gratings. Each grating in the stack is configured to maximize the diffraction efficiency of a different color of light. When the grating corresponding to a given light color is switched on, that light passes through the grating and is diffracted into the desired illumination direction. This configuration requires very precise alignment of the light sources and the stacked diffraction grating.

BRIEF DESCRIPTION OF THE DRAWINGS

Various features and advantages of the invention will be apparent from the detailed description which follows, taken in conjunction with the accompanying drawings, which together illustrate, by way of example, features of the invention, and wherein.

DETAILED DESCRIPTION

Figure 1:
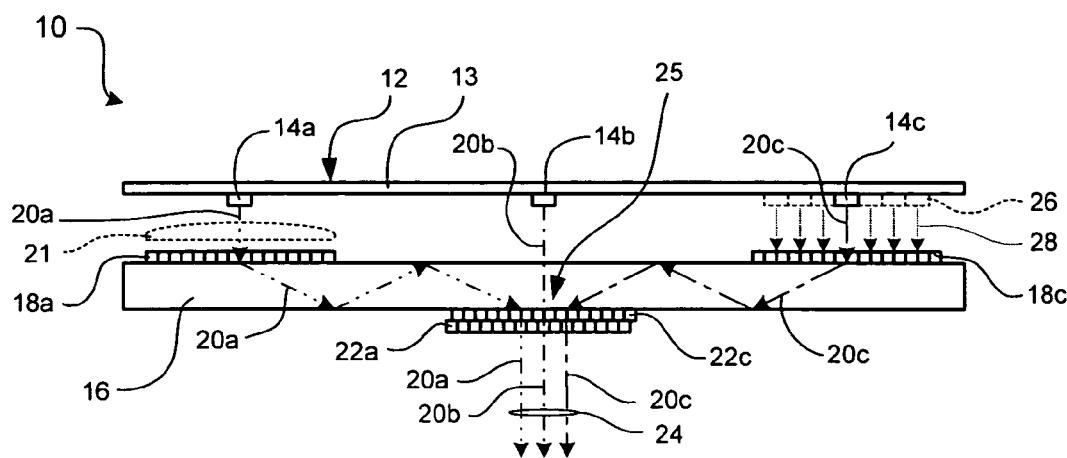
FIG. 1 is a schematic diagram of an embodiment of a light coupling system.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention which would occur to one skilled in the relevant art and having possession of this disclosure are to be considered within the scope of the disclosure.

As noted above, there are a variety of types of illumination sources that are used in projection systems. However, some of these devices are bulky, noisy, and expensive, and operate at relatively high temperatures. Additionally, many projector light sources have a limited useful life, and are not very energy efficient. It would be desirable to provide a light source for a projection system that is more compact, quiet, inexpensive, durable and long-lasting, cooler-operating, and more energy efficient than other systems. It would also be desirable to develop a light source for a projection system that requires relatively low precision in alignment of components, and allows the combination of light from a planar array of lighting sources. Advantageously, the inventors have developed a system and method for combining and redirecting light from multiple LEDs or other light sources for use in a projection system.

Figure 3:
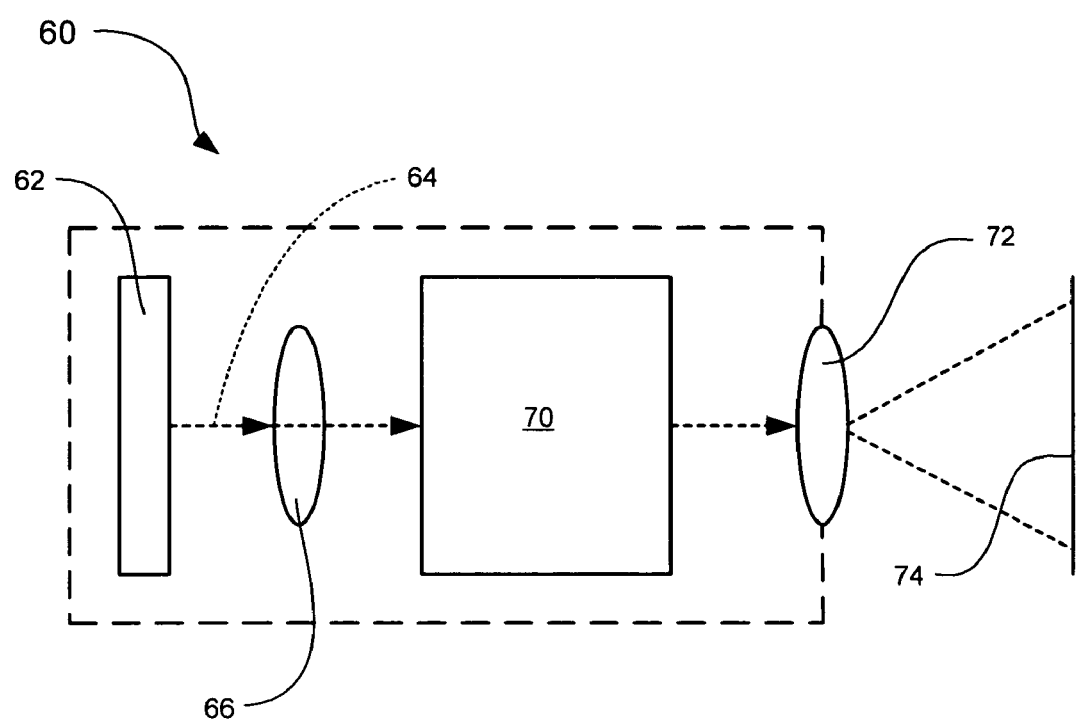
FIG. 3 is a schematic diagram of a projection system employing a light coupling system in accordance with the present disclosure.

The light coupling system disclosed herein is useful in projection systems, such as that shown in FIG. 3. As with most digital projection systems, this projection system 60 generally includes a projection light source 62, which provides projection light along a projection path 64. The light passes through an initial set of optical elements 66 (e.g. lenses, etc.) prior to contacting the spatial light modulator 70. As noted above, the spatial light modulator can be an LCD device, LCOS device, a DMD, or any other suitable type of spatial light modulator. Once the light modulator provides the desired image, the light carrying this image passes through projection optics 72 (e.g. lenses, etc.) and is projected to a projection surface 74, such as a screen.

Various details of the spatial light modulator and the projection system that are not necessary for the present disclosure are not specifically shown in FIG. 3. Moreover, the light coupling system disclosed herein can be used with projector types and configurations different from that shown. For example, the projector 60 shown in FIG. 3 can be a front projection or rear projection system.

As noted above, various types of light systems can be used for the light source 62 to provide the projection light required by the spatial light modulator. Shown in FIG. 1 is an embodiment of a light coupling system 10 that is configured to couple light from three different light sources into a single common or overlapped output stream 24 that can be used for a projection system. In this embodiment, the light coupling system generally comprises a substantially planar array 12 of colored lighting elements 14, and a waveguide 16. Disposed upon the waveguide opposite the corresponding lighting elements are diffraction gratings 18 that are configured to couple light from the respective light elements into the waveguide.

Disposed upon the opposite face of the waveguide 16 at a central region are a pair of switchable Bragg gratings 22. Within the waveguide, the light from the lighting elements, indicated by arrows 20, internally reflects between the waveguide surfaces, until reaching the switchable Bragg gratings. When the Bragg grating for a particular light color is turned on, that color of light is coupled out of the waveguide, and is caused to project along the projection path or projection axis, designated collectively at 24.

While the lighting elements 14 are shown in a planar array 12 in FIG. 1, it will be apparent that the configuration of the lighting elements can be different from this. For example, the lighting elements can be separate elements, and need not necessarily be disposed in an array or in a planar arrangement or on a common substrate. Likewise, those skilled in the art will recognize that an array of lighting elements that is not oriented parallel to the waveguide can also be adapted to this light coupling system.

The array 12 of lighting elements 14 can include two or more lighting elements of different colors. A variety of types of lighting elements can be used, including LEDs and lasers. Considering the embodiment of FIG. 1, the array comprises three lighting elements, specifically, color 1 lighting element 14a, color 2 lighting element 14b, and color 3 lighting element 14c. Colors 1, 2, and 3 can be, for example, red, green, and blue. These are the primary colors commonly used for producing a white light display. However, the light coupling system is not limited to three colors, and the colors that are employed need not be limited to red, green and blue.

Where the lighting elements are LEDs, the array can comprise a planar substrate 13, such as a common printed circuit board, having the LED elements formed directly thereon or attached thereto. Similarly, where the lighting elements are lasers, the lasers can comprise laser diodes that are disposed directly on the circuit board substrate. Additionally, the lighting elements can comprise a combination of laser and LED elements.

While the embodiment of FIG. 1 generally depicts three individual lighting elements 14, each lighting element can comprise a group or cluster of lighting elements of a common color. For example, the light output required for most projection systems is generally greater than the output of single LEDs that are now commonly available. Accordingly, where LEDs are used as the lighting elements, a group of LEDs is likely to be needed to provide the desired light output in each color. Additionally, the power output of individual LEDs can vary depending upon the color of the LED, so that for a given desired light output for each color of the array, a different quantity of LED lighting elements may be needed in each color cluster. Thus, as shown in FIG. 1, the color 3 lighting element 14c (and each of the other lighting elements 14) can comprise multiple lighting elements (represented by dashed lines 26), all providing light to the associated diffraction grating 18c, as indicated by arrows 28. The same is true for laser light sources. Each lighting element can comprise multiple laser diodes disposed in a group or cluster.

While significant space is shown between the respective color lighting elements 14 in FIG. 1, it will be apparent that each of the lighting elements or clusters can be placed close together, so that the array can provide the needed light in a smaller space. It will also be apparent that in such a situation the waveguide, the diffraction gratings, and the Bragg gratings must be of a sufficient size to receive and transmit the incident light. At the same time, the clusters of colored light sources can be separated by, e.g. 2 mm, so as to help prevent light leakage between color arrays.

The waveguide 16 is of a generally uniform thickness, and is disposed substantially parallel to the planar array 12. The waveguide can be a plate of ordinary glass or plastic. Its thickness can vary. As a practical matter, thicknesses in the range of from about 0.1 mm to about 1 mm are considered most likely, though these values are not actual limits. A thickness of 0.5 mm is believed to be a practical value.

The waveguide 16 is designed to provide substantially total internal reflection of light within. The waveguide has a critical angle that is a property of its material (i.e. glass or plastic). Ordinary glass has a critical angle of about 42°. Light that strikes the waveguide at an angle of incidence that varies from perpendicular by an amount greater than the critical angle will be totally internally reflected between the surfaces of the waveguide, while light that is outside that range will not.

The diffraction gratings 18 are configured to couple light into the waveguide 16 at an angle that is greater than the critical angle, so that the diffracted light internally reflects within the waveguide. As is well known by those of skill in the art, a diffraction grating is a group of parallel lines or bars that are spaced so as to produce a series of slits of a specific width and at a specific spacing. The width and spacing of the slits are correlated to a specific wavelength of light, and have the effect of diffracting light of that particular wavelength. Light of different wavelengths will be diffracted at a different angle, and thus may not be totally internally reflect by the waveguide. The diffraction gratings can be lithographically printed onto the surface of the waveguide, or they can be molded or otherwise formed on the surface of the waveguide.

The diffraction gratings 18 cause light of the target wavelength to be diffracted by a diffraction angle that is a function of the geometry of the diffraction grating and the wavelength of the light. Consequently, the diffracted light entering the waveguide 16 will enter at an appropriate angle (greater than the critical angle) so as to be internally reflected toward the target region 25 where the Bragg gratings 22 are located.

The waveguide 16 can be positioned directly adjacent to the light array 12, or it can be spaced some distance away from the array, as shown in FIG. 1. If desired, optical elements, such as a lens 21 (shown in dashed lines in FIG. 1), can be placed between the light array and the waveguide to manipulate the light in various ways. For example, a lens can be used to focus light from a light source having a large surface area onto a diffraction grating having a smaller total area. Filters, collimating lenses, and other optical elements can also be located between the light sources and the waveguide if desired.

The switchable Bragg gratings 22 are essentially electronically switchable diffraction gratings. These can be configured to operate much like liquid crystal display devices, producing a visible image (that of a grating of bars and spaces) when switched on, and to be transparent when switched off. Like the diffraction gratings 18, the Bragg gratings are wavelength specific, and operate to diffract light of a given wavelength with a specific diffraction angle. More specifically, the Bragg gratings have a diffraction angle that is complementary to the angle of internal reflection of the waveguide, so that when internally reflected light will be diffracted out of the waveguide at an angle that is substantially perpendicular to the plane of the waveguide, and parallel to the projection path (the path of lines designated at 24). The Bragg gratings thus have the opposite effect of the diffraction gratings, receiving internally-reflected light of a specific wavelength, and diffracting that light out of the waveguide in a direction that is substantially collinear with the projection path.

In the embodiment depicted in FIG. 1, the light of color 1 (represented by arrow 20a) from the color 1 lighting element 14a is coupled into the waveguide 16 by the color 1 diffraction grating 18a, and coupled out by the color 1 Bragg grating 22a. Color 3 light (represented by arrow 20c) from the color 3 lighting element 14c is coupled into the waveguide by the color 3 diffraction grating 18c, and coupled out by the color 3 Bragg grating 22c. Light of color 2 (represented by arrow 20b) from the center lighting element 14b, which is aligned with the center region 25 of the waveguide, is allowed to pass directly through the waveguide.

In the configuration of FIG. 1, the lighting portion of each image frame that is provided by the center lighting element 14b is directly controlled by the illumination (i.e. switching on/off) of the center lighting element. The center lighting element is specifically aligned with the projection path or axis 24 of the lighting system, perpendicular to the waveguide 16, so that the waveguide has no effect upon its light. It will be apparent that this is only one possible configuration. For example, the system could be configured with none of the lighting elements aligned with the projection axis, such that all lighting elements are coupled into the waveguide at different locations (via diffraction gratings) and then coupled out (via switchable Bragg gratings) at some common location to provide the overlapping output stream along the common projection path or axis.

Where there is a center light element 14b that is not redirected in any way, as depicted in FIG. 1, the Bragg gratings 22 are configured so that light from the other light sources is coupled out in the same direction as that of the center light source, and thus also proceeds along the same projection path or axis 24. When switched off, the Bragg gratings are configured to freely allow passage of the light from the center light source, and to selectively couple the light of the respective colored light sources out of the waveguide, and direct that light along the projection axis. While the three colored light paths shown exiting the Bragg gratings in FIG. 1 (designated collectively at 24) are shown as separate lines, this is for illustrative purposes only. The light system is configured so that the respective light colors overlap and project along a common projection axis or path. The effective result is a single beam of light that rapidly switches color between each of the illumination colors of the lighting array.

Figure 2:
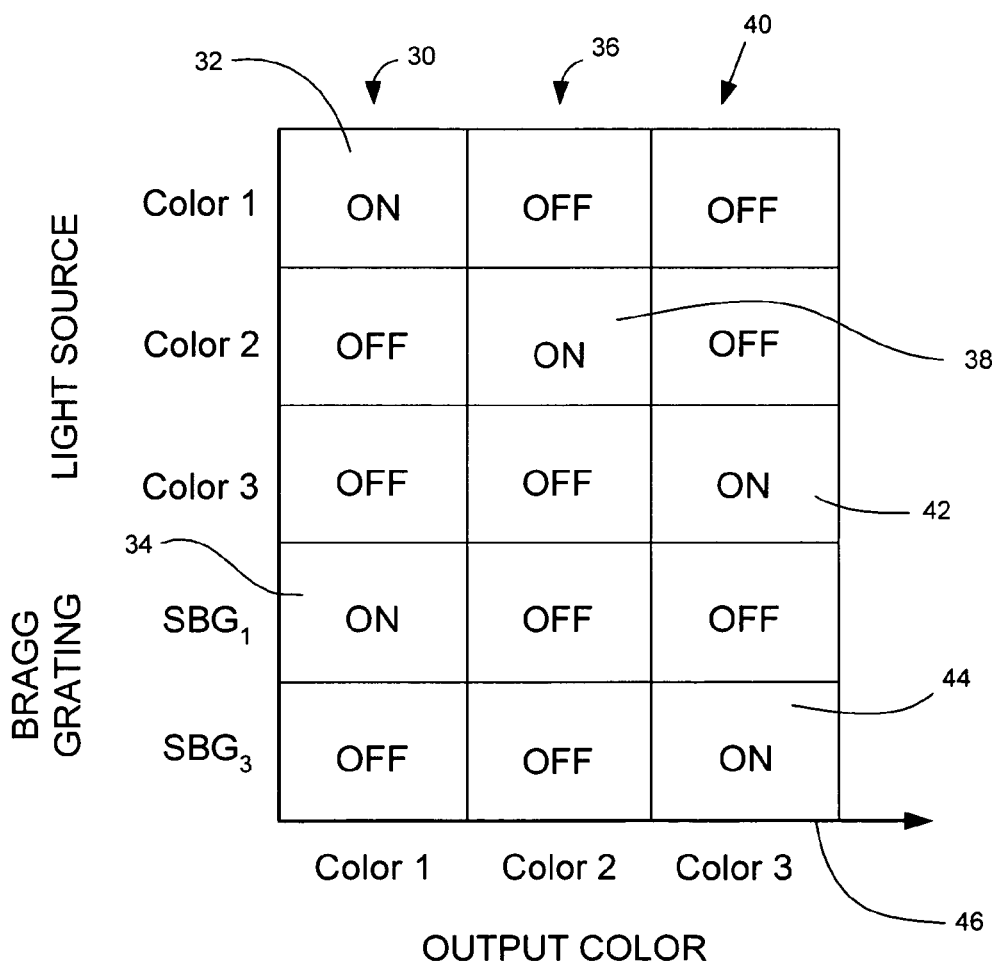
FIG. 2 is a state diagram showing the condition of the light sources and the switchable Bragg gratings of the embodiment of FIG. 1 for producing various primary output colors.

One switching scheme by which the light coupling system can operate is depicted in the state diagram of FIG. 2. In this diagram, the horizontal axis 46 represents time. This switching scheme causes the output color of the beam to sequentially switch from color 1 to color 2 to color 3, as labeled along the horizontal axis. This sequence can temporally occupy the entirety of one image frame period, so that each primary color is provided for a portion of the frame period, and the resulting image appears as a full color blend of the primary colors.

During the first portion of the frame period, represented by column 30, the color 1 lighting element (14a in FIG. 1) is on, as indicated at 32, and the color 1 Bragg grating (22a in FIG. 1; labeled $SBG_1$ in FIG. 2) is also on, as indicated at 34, while the other lighting element and the color 3 Bragg grating are all off. In this condition, the light from the color 1 lighting element is coupled into the waveguide by the color 1 diffraction grating, and coupled out of the waveguide and directed along the projection path by the color 1 switchable Bragg grating, thus giving a color 1 output color.

During the second portion of the frame period, represented by column 36, the color 2 lighting element (14b in FIG. 1) is switched on, as indicated at 38, while the other lighting elements and both switchable Bragg gratings are off. Because the color 2 lighting element is oriented at the center of the light array, and is configured to project its light along the projection path, no modification of its light is required. When the switchable Bragg gratings are off, they are transparent to the color 2 light, thus giving a color 2 output color.

During the third portion of the frame period, represented by column 40, the color 3 lighting element (14c in FIG. 1) is switched on, as indicated at 42, and the color 3 Bragg grating (22c in FIG. 1; labeled $SBG_3$ in FIG. 2) is also on, as indicated at 44, while the other lighting elements and the color 1 Bragg grating are all off. In this condition, the light from the color 3 lighting element is coupled into the waveguide by the color 3 diffraction grating, and coupled out of the waveguide and directed along the projection path by the color 3 switchable Bragg grating, thus giving a color 3 output color.

While this illumination scheme provides color 1, color 2, and color 3 light sequentially, it will be apparent that other control schemes could be used for different effects. For example, more or less than three colors can be used. Additionally, multiple color lighting elements can be simultaneously illuminated, so as to provide an output color that is a combination of two of the primary color light sources. Likewise, the color sequence can be reconfigured to provide the colors in a different order, and with a greater or lesser number of time intervals and time intervals of different length for each color during a given frame interval. Many other configurations are also possible.

This light coupling system uses color light sources in a compact "monolithic" package to provide overlapping sequential color lighting along a common path or axis. Where LEDs are used, the packaging and orientation of the lighting elements is simplified because the LEDs are co-planar. The cost of this type of system can be low relative to similar technologies in part because it is insensitive to angular orientation of the LEDs. On the other hand, systems using dichroic prisms or stacked diffraction gratings require very precise alignment of the separate LEDS at specific angles to allow the separate light colors to overlap, which makes them more difficult and more costly to produce. With LEDs all on a single substrate, they are naturally in a single plane, and thus proper alignment is automatically assured by routine fabrication processes of the LEDs. Similar benefits can apply when using laser lighting elements. Laser diodes can be formed on a common substrate, thus providing a simple planar lighting array.

The planar array configuration and planar waveguide also naturally combine to promote proper accuracy of alignment of the waveguide with the light array. This robust configuration allows the component parts (the waveguide and the light array) to be assembled without the need for highly exacting assembly procedures and standards. Thus, for example, the LED array and the waveguide can be separately manufactured at different locations, then assembled at a third location, and still obtain quality results. Some alternative technologies require concurrent high precision fabrication and assembly of the lighting elements and the light-combining structure to provide a product with acceptable quality and reliability.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A light coupling system, comprising:
   a substantially planar array of light sources of different colors;
   a waveguide, disposed substantially parallel to the planar array, a first of the light sources being configured to project light directly through the waveguide along a projection axis;
   first means for coupling light from a second of the light sources into the waveguide at an angle selected to cause internal reflection of the light within the waveguide; and
   first switchable means for selectively coupling the light of the second light source out of the waveguide and directing said light along the projection axis.

2. A light coupling system in accordance with claim 1, wherein the light sources are selected from the group consisting of lasers and light emitting diodes.

3. A light coupling system in accordance with claim 1, wherein the light sources comprise groups of light emitting diodes, each group having a common color.

4. A light coupling system in accordance with claim 1, wherein the different colors of the light sources are selected from the group consisting of red, green and blue.

5. A light coupling system in accordance with claim 1, wherein the waveguide comprises a plate of substantially constant thickness, configured to substantially totally internally reflect light therein, the plate being of a material selected from the group consisting of glass and plastic.

6. A light coupling system in accordance with claim 1, wherein the first means for coupling light from the second light source comprises a first diffraction grating, disposed upon the waveguide, and aligned with the second light source.

7. A light coupling system in accordance with claim 1, further comprising second means for coupling light from a third of the light sources into the waveguide.

8. A light coupling system in accordance with claim 7, wherein the second means for coupling light from the third light source comprises a second diffraction grating, disposed upon the waveguide, and aligned with the third light source.

9. A light coupling system in accordance with claim 1, wherein the first switchable means for selectively coupling the light of the second light source out of the waveguide comprises a first switchable Bragg grating, configured to freely allow passage of the light from the first light source, and to selectively couple the light of the second light source out of the waveguide.

10. A light coupling system in accordance with claim 1, further comprising second switchable means for selectively coupling light of a third light source out of the waveguide, and directing said light along the projection axis.

11. A light coupling system in accordance with claim 10, wherein the second switchable means for selectively coupling light of a third light source comprises a second switchable Bragg grating, configured to freely allow passage of the light from the first light source, and to selectively couple the light of the third light source out of the waveguide.

12. A light coupling system, comprising:
    a substantially planar array of light sources of different colors;
    a waveguide, disposed substantially parallel to the planar array, a first of the light sources being configured to project light directly through the waveguide along a projection axis;
    a first diffraction grating, disposed upon the waveguide, configured to couple light from a second of the light sources into the waveguide; and
    a first switchable Bragg grating, disposed upon the waveguide, configured to freely allow passage of the light from the first light source, and to selectively couple the light of the second light source out of the waveguide and direct said light along the projection axis.

13. A light coupling system in accordance with claim 12, wherein the array of light sources comprise light emitting diodes disposed upon a common substrate.

14. A light coupling system in accordance with claim 12, wherein the light sources comprise groups of light emitting diodes, each group having a common color.

15. A light coupling system in accordance with claim 12, wherein the different colors of the light sources are selected from the group consisting of red, green and blue.

16. A light coupling system in accordance with claim 12, wherein at least one of the light sources includes a laser.

17. A light coupling system in accordance with claim 12, further comprising a second diffraction grating, disposed upon the waveguide, configured to couple light from a third of the light sources into the waveguide; and a second switchable Bragg grating, disposed upon the waveguide, configured to freely allow passage of the light from the first light source, and to selectively couple the light of the third light source out of the waveguide and direct said light along the projection axis.

18. A light coupling system, comprising:
    a substantially planar array comprising three light sources of different colors;
    a waveguide, disposed substantially parallel to the planar array, and positioned to allow light from a first of the light sources to project directly through the waveguide along a projection axis;
    a first diffraction grating, disposed upon the waveguide, configured to couple light from a second of the light sources into the waveguide;
    a second diffraction grating, disposed upon the waveguide, configured to couple light from a third of the light sources into the waveguide;
    a first switchable Bragg grating, disposed upon the waveguide, configured to freely allow passage of the light from the first light source, and to selectively couple the light of the second light source out of the waveguide, and direct said light along the projection axis; and
    a second switchable Bragg grating, disposed upon the waveguide, configured to freely allow passage of the light from the first light source, and to selectively couple the light of the third light source out of the waveguide, and direct said light along the projection axis.

19. A light coupling system in accordance with claim 18, wherein the three light sources comprise red, green, and blue LEDs.

20. A light coupling system in accordance with claim 18, wherein the waveguide comprises a plate of substantially constant thickness, configured to substantially totally internally reflect light therein, the plate being of a material selected from the group consisting of glass and plastic.

21. A light coupling system, comprising:
   a waveguide, configured to receive light from at least two light sources, and to internally reflect light therein;
   a diffraction grating, disposed upon the waveguide, configured to couple light from at least one of the light sources into the waveguide; and
   a switchable Bragg grating, disposed upon the waveguide, configured to selectively couple light out of the waveguide, such that the light from the at least two light sources is selectively directed along a common projection axis.

22. A light coupling system in accordance with claim 21, wherein the at least two light sources include at least one of a laser and a light emitting diode.

23. A light coupling system in accordance with claim 21, wherein the at least two light sources comprise a substantially planar array disposed substantially parallel to the waveguide.

* * * * *